(12) United States Patent
Nishino et al.

(10) Patent No.: US 8,111,035 B2
(45) Date of Patent: Feb. 7, 2012

(54) CHARGING SYSTEM, CHARGING DEVICE AND BATTERY PACK

(75) Inventors: Hajime Nishino, Osaka (JP); Jun Asakura, Osaka (JP); Yoshio Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 1103 days.

(21) Appl. No.: 11/946,362

(22) Filed: Nov. 28, 2007

(65) Prior Publication Data

US 2008/0122399 A1    May 29, 2008

(30) Foreign Application Priority Data

Nov. 29, 2006    (JP) ................................. 2006-322141

(51) Int. Cl.
*H02J 7/00*    (2006.01)
*H02J 1/12*    (2006.01)
*H01M 2/12*    (2006.01)

(52) U.S. Cl. .......... 320/103; 320/107; 320/112; 307/46; 307/64; 307/66; 429/89

(58) Field of Classification Search .................... 320/103
See application file for complete search history.

(56) References Cited

U.S. PATENT DOCUMENTS

| 5,903,131 A | * | 5/1999 | Sekine et al. | 320/106 |
| 2005/0017692 A1 | * | 1/2005 | Izumi et al. | 320/150 |
| 2005/0112416 A1 | * | 5/2005 | Sakakibara | 429/9 |
| 2006/0028168 A1 | * | 2/2006 | Nishida | 320/106 |

FOREIGN PATENT DOCUMENTS

| CN | 2389376 Y | | 7/2000 |
| JP | 5-111184 A | | 4/1993 |
| JP | 6-78471 | | 3/1994 |
| JP | 8-098426 A | | 4/1996 |
| JP | 8-163788 A | | 6/1996 |
| JP | 09-084277 | * | 3/1997 |

OTHER PUBLICATIONS

Japanese Notice of Reasons for Rejection, w/ English translation thereof, issued in Japanese Patent Application No. JP 2006-322141 dated Sep. 7, 2010.
Chinese Office Action, w/ English translation thereof, issued in Chinese Patent Application No. CN 200710194670.1 dated Mar. 3, 2011.

* cited by examiner

*Primary Examiner* — Yalkew Fantu
(74) *Attorney, Agent, or Firm* — McDermott Will & Emery LLP

(57) ABSTRACT

A charging system is provided with a secondary battery, a charging current supplier for supplying a charging current to the secondary battery, an internal resistance detector for detecting the resistance value of the internal resistance of the secondary battery, and a charge controller for increasing the charging current to be supplied to the secondary battery by the charging current supplier as the resistance value detected by the internal resistance detector decreases.

10 Claims, 7 Drawing Sheets

US 8,111,035 B2

CHARGING SYSTEM, CHARGING DEVICE AND BATTERY PACK

CLAIM OF PRIORITY

This application claims the benefit of Japanese Patent Application No. JP 2006-322141, filed on Nov. 29, 2006, the disclosure of which is incorporated herein by reference.

BACKGROUND OF THE INVENTION

1. Field of the Invention

The present invention relates to a charging system and a charging device for charging a secondary battery and a battery pack provided with a secondary battery.

2. Description of the Background Art

FIG. 6 is a chart showing an operation of charging a secondary battery by a constant-current, constant-voltage (CCCV) charging according to a background part. FIG. 6 shows a closed circuit voltage CCV of the secondary battery, an open circuit voltage OCV of the secondary battery, a charging current Ic, a state of charge SOC of the secondary battery and an internal resistance Ri of the secondary battery in the case of charging the secondary battery, e.g. a lithium ion battery. FIG. 7 is a conceptual diagram showing an equivalent circuit of a secondary battery 100.

The equivalent circuit of the secondary battery 100 shown in FIG. 7 is represented by a series circuit of a voltage source E and the internal resistance Ri. Then, the closed circuit voltage CCV is equivalent to voltages at the opposite ends of the series circuit of the voltage source E and the internal resistance Ri, and the open circuit voltage OCV is equivalent to voltages at the opposite ends of the voltage source E. The secondary battery 100 may be assembled cells in which, for example, a plurality of unit cells of a lithium ion battery are connected in series parallel.

In CCCV charging, charging by constant current I2 is first carried out. In constant current discharge of one hour, the current level that can discharge electricity assumes a nominal capacity NC "1C". Then, the electric current which multiplied number P of the cells arranged in parallel by 70% of the electric current of the "1C" is I2. In this way, the constant current I2 is charged.

When the closed circuit voltage CCV reaches a final voltage Vf (×the number of the cells arranged in series), a transition is made to a constant voltage (CV) charging area and the charging current Ic is decreased so as not to exceed the final voltage Vf (×the number of the cells arranged in series). When the charging current Ic is decreased to a current value I3 set according to temperature, full charging is judged and the supply of the charging current is stopped. The above charging control method can be read, for example, from Japanese Unexamined Patent Publication No. H06-78471.

In such CCCV charging, the maximum value of the charging current Ic is the current I2 flowing into the secondary battery 100 during the constant current (CC) charging from the start to the end of the charging.

The internal resistance Ri of the battery is a sum of reaction resistance, which results from movements of electric charges caused by the chemical reaction in the battery, and electronic resistance, which is resistance of electrolyte and electrodes. In the secondary battery 100, e.g. the lithium ion battery, if a state of charge SOC (hereinafter, merely "SOC") is low, an active material on the outer surfaces of the electrodes contracts to increase electronic resistance. If the SOC is high, the active material on the outer surfaces of the electrodes expands to reduce electronic resistance. Thus, the internal resistance Ri has a property of becoming larger as the SOC decreases while becoming smaller as charging proceeds to increase the SOC.

Then, at an initial stage of the charging where the constant current (CC) charging was started, the current I2 flows through the internal resistance Ri when the active material contracts to maximize the internal resistance Ri. Thus, a voltage drop by the internal resistance Ri increases. Since the closed circuit voltage CCV is a sum of the open circuit voltage OCV and the voltage drop by the internal resistance Ri, a difference between the open circuit voltage OCV and the closed circuit voltage CCV is largest at the initial stage of the charging and becomes gradually smaller as the charging proceeds to decrease the internal resistance Ri. It is possible to think of the internal resistance Ri while dividing it into an internal resistance Rim caused at the negative electrode side of the secondary battery 100 and an internal resistance Rip caused at the positive electrode side.

FIG. 8 is a chart showing the open circuit voltage OCV, the closed circuit voltage CCV and a relationship of potentials at the positive and negative electrodes with respect to a lithium reference. In FIG. 8, a voltage V1 represents a voltage drop caused by the flow of the charging current Ic through the internal resistance Rim at the negative electrode side, wherein V1=Rim×Ic. Further, a voltage V2 represents a voltage drop caused by the flow of the charging current Ic through the internal resistance Rip at the positive electrode side, wherein V2=Rip×Ic.

Here, if the internal resistance Ri is zero, i.e. the internal resistance Rim is zero at the start of the charging, i.e. in a state where the SOC is substantially zero, the closed circuit voltage CCV is equal to the open circuit voltage OCV and the negative electrode potential with respect to the lithium reference takes a positive value larger than 0 V. However, the internal resistance Ri is actually not zero and, accordingly, CCV=OCV+V1+V2=OCV+Rim×Ic+Rip×Ic. Then, the negative electrode potential of the secondary battery 100 is decreased by V1=Rim×Ic. Here, since Rim increases because the SOC is lowest at the start of the charging and the charging current Ic is the maximum current I2 from the start to the end of the charging by the constant current (CC) charging, there is a likelihood that V1 is also maximized from the start to the end of the charging and the negative electrode voltage of the secondary battery 100 falls to or below 0 V. If the negative electrode voltage falls to or below V, there has been a problem that lithium precipitates at the negative electrode to deteriorate the secondary battery 100.

SUMMARY OF THE INVENTION

In view of the above situation, an object of the present invention is to provide a charging system, a charging device and a battery pack capable of reducing a likelihood of deteriorating a secondary battery due to the internal resistance of the secondary battery.

One aspect of the present invention is directed to a charging system, comprising a secondary battery; a charging current supplier for supplying a charging current to the secondary battery; an internal resistance detector for detecting the resistance value of the internal resistance of the secondary battery; and a charge controller for increasing the charging current to be supplied to the secondary battery by the charging current supplier as the resistance value detected by the internal resistance detector decreases.

According to this construction, the charging current is increased as the internal resistance of the secondary battery decreases, and the charging current is decreased as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current.

Another aspect of the present invention is directed to a charging device, comprising a connection terminal for the connection with a secondary battery; a charging current supplier for supplying a current for charging the secondary battery to the connection terminal; an internal resistance detector for detecting the resistance value of the internal resistance of the secondary battery connected with the connection terminal; and a charge controller for increasing the current to be supplied to the connection terminal by the charging current supplier as the resistance value detected by the internal resistance detector decreases.

According to this construction, the charging current is increased as the internal resistance of the secondary battery connected with the connection terminal decreases while being decreased as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current.

Still another aspect of the present invention is directed to a battery pack to be connected with a charging device for outputting a current for charging a secondary battery in response to an external instruction, comprising a secondary battery; an internal resistance detector for detecting the resistance value of the internal resistance of the secondary battery; and a charge controller for charging the secondary battery by outputting the instruction to the charging device so that a current to be supplied to the secondary battery by the charging device is increased as the resistance value detected by the internal resistance detector decreases.

According to this construction, in response to the instruction from the charge controller, the charging device increases the charging current as the internal resistance of the secondary battery decreases while decreasing the charging current as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current. In this case, it is sufficient for the charging device to output the current in response to the instruction from the battery pack, the same charging device can be used even in the case of charging a battery pack including a secondary battery having different characteristics.

These and other objects, features and advantages of the present invention will become more apparent upon a reading of the following detailed description and accompanying drawings.

BRIEF DESCRIPTION OF THE DRAWINGS

FIGS. 2A and 2B are charts showing an operation of an internal resistance calculating section shown in FIG. 1, wherein FIG. 2A shows a current flowing into a secondary battery and FIG. 2B shows a terminal voltage of the secondary battery.

DESCRIPTION OF PREFERRED EMBODIMENTS

Figure 1:
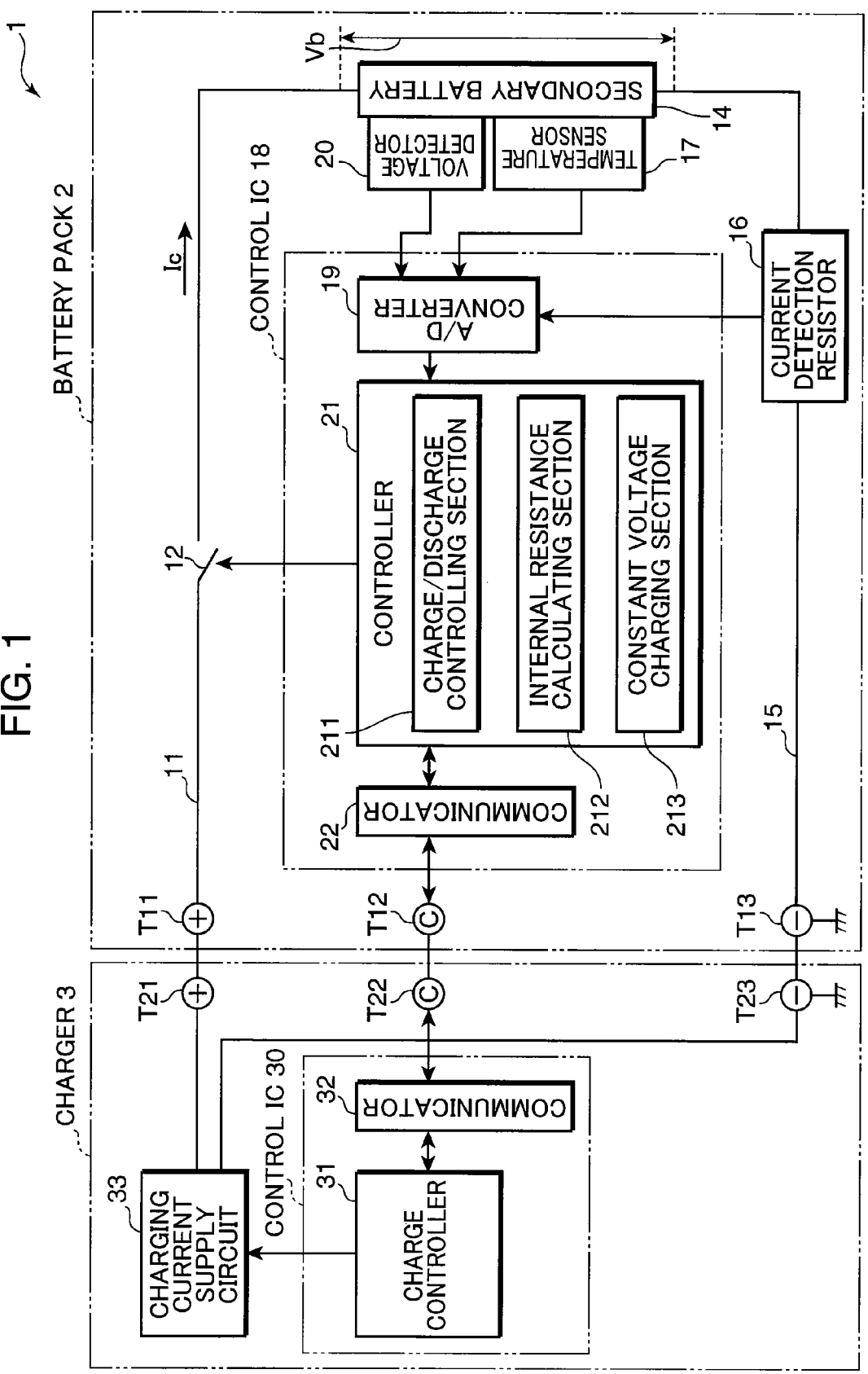
FIG. 1 is a block diagram showing an exemplary construction of a charging system according to one embodiment of the invention.

Hereinafter, one embodiment of the present invention is described with reference to the accompanying drawings. It should be noted that constructions identified by the same reference numerals in the respective figures are the same constructions and are not repeatedly described. FIG. 1 is a block diagram showing an exemplary construction of a charging system according to one embodiment of the present invention. This charging system 1 includes a battery pack 2 and a charger 3 for charging the battery pack 2. An unillustrated load equipment to have power supplied from the battery pack 2 may be further included to construct an electronic equipment system which is an example of the charge system. In such a case, the battery pack 2 charged by the charger 3 in FIG. 1 may be installed in the load equipment and charged through the load equipment. The battery pack 2 and the charger 3 is connected with each other by high-side terminals T11, T21 for a direct current for power feeding, terminals T12, T22 for communication signals and GND terminals T13, T23 for power feeding and communication signals. Similar terminals are provided also in the case of providing the load equipment.

A switching element 12, for example, comprised of a FET (Field Effect Transistor), a relay switch and the like is provided in a high-side charging path 11 for the direct current extending from the terminal T11, and this charging path 11 is connected with a high-side terminal of the secondary battery 14. A low-side terminal of the secondary battery 14 is connected with the GND terminal T13 via a low-side charging path 15 for the direct current, and a current detection resistor 16 (current detector) for converting a charging current and a discharging current into voltage values is provided in this charging path 15.

For example, a lithium ion secondary battery is used as the secondary battery 14. Further, the secondary battery 14 may be assembled cells in which a plurality of secondary batteries are connected in series parallel.

The temperature of the secondary battery 14 is detected by a temperature sensor 17 and inputted to an analog-to-digital (A/D) converter 19 in a control IC 18. A terminal voltage Vb of the secondary battery 14 is read by a voltage detection circuit 20 (voltage detector) and inputted to the analog-to-digital converter 19 in the control IC 18. Further, a current value detected by the current detection resistor 16 is inputted to the analog-to-digital converter 19 in the control IC 18. The analog-to-digital converter 19 converts the respective input values into digital values and outputs them to a controller 21.

The controller 21 includes, for example, a CPU (Central Processing Unit) for performing a specified arithmetic processing, a ROM (Read Only Memory) storing a specified control program, a RAM (Random Access Memory) temporarily saving data, peripheral circuits and the like of these, and functions as a charge/discharge controlling section 211 (charge controller), an internal resistance calculating section 212 (internal resistance detector) and a constant voltage charging section 213 by executing the control program stored in the ROM.

The charge/discharge controlling section 211 calculates the voltage value and current value instructed to be outputted from the charger 3 in response to the respective input values from the analog-to-digital converter 19, and sends the calculated voltage value and current value from a communicator 22 to the charger 3 via the terminals T12, T22; T13, T23. The charge/discharge controlling section 211 performs protection operations, for example, by shutting off the switching element 12 based on the respective input values from the analog-to-digital converter 19 in response to a short circuit between the terminals T11 and T13, abnormality outside the battery pack 2 such as an abnormal current from the charger 3, an abnormal temperature increase of the secondary battery 14 and the like.

Further, the charge/discharge controlling section 211 increases the charging current Ic to be supplied to the secondary battery 14 by the charger 3 as the internal resistance Ri of the secondary battery 14 calculated by the internal resistance controlling section 212 decreases.

Figure 2A:
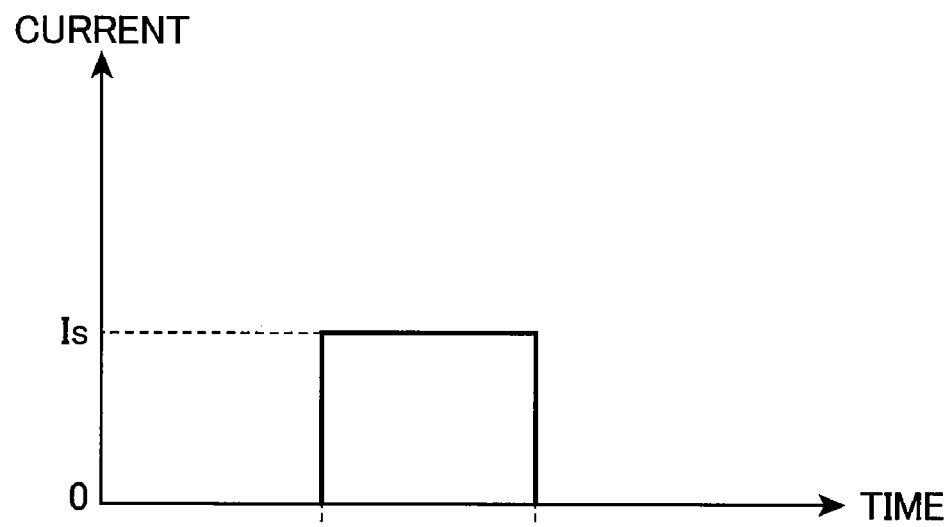
Figure 2B:
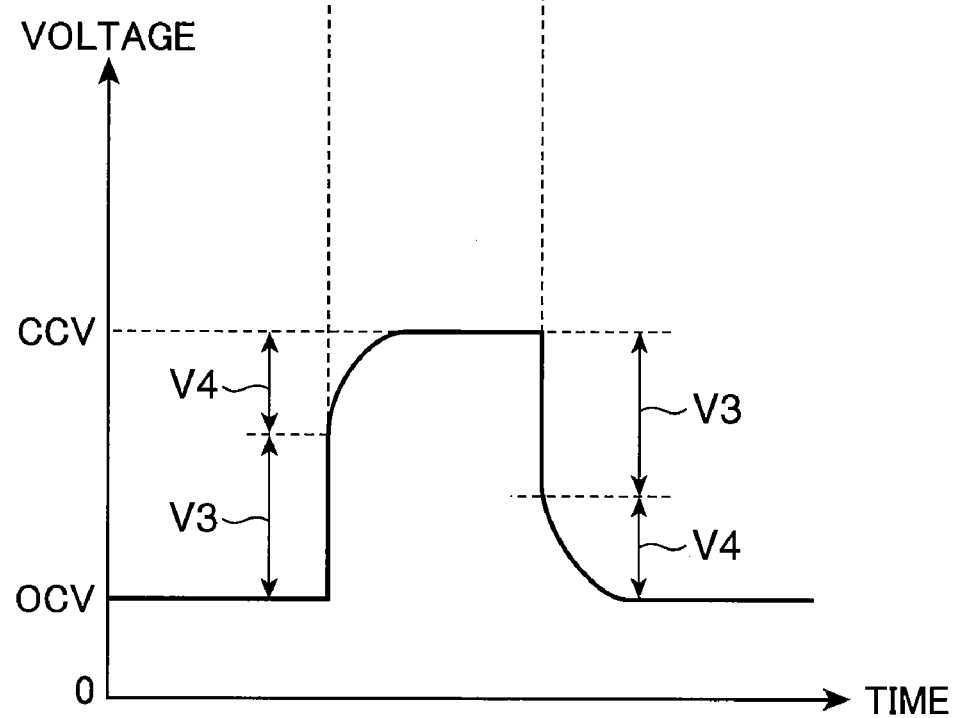

The internal resistance controlling section 212 detects the internal resistance Ri of the secondary battery 14. FIG. 2 are charts showing the operation of the internal resistance controlling section 212, wherein FIG. 2A shows a current flowing into the secondary battery 14 and FIG. 2B shows the terminal voltage Vb of the secondary battery 14. First, the internal resistance controlling section 212 sends an instruction to output an internal resistance detection current Is from the communicator 22 to the charger 3 via the terminals T12, T22; T13, T23, and the internal resistance detection current Is (first internal resistance detection current) is supplied to the secondary battery 14 by the charger 3. Subsequently, the internal resistance controlling section 212 obtains the terminal voltage Vb of the secondary battery 14 obtained in the analog-to-digital converter 19, i.e. a closed circuit voltage CCV, sends an instruction to zero the current supply of the charger 3 (corresponding to the case of setting a second internal resistance detection current to 0 A) from the communicator 22 to the charger 3 via the terminals T12, T22; T13, T23, and obtains the terminal voltage Vb of the secondary battery 14 obtained in the analog-to-digital converter 19, i.e. an open circuit voltage OCV when the current flowing into the secondary battery 14 is zeroed. Then, the internal resistance controlling section 212 calculates the internal resistance Ri by the following equation (1):

$$Ri=(CCV-OCV)/Is \qquad (1).$$

In FIG. 2B, a voltage V3 generated simultaneously with a current pulse of FIG. 2A is a voltage component resulting from electronic resistance and a voltage component V4, which gradually changes from a timing later than the current pulse of FIG. 2A, is a voltage component resulting from reaction resistance.

It is sufficient to set the second internal resistance detection current to a current value different from the first internal resistance detection current, and the second internal resistance detection current is not limited to 0 A. For example, if it is assumed that $Is_1$ denotes the first internal resistance detection current, $CCV_1$ the terminal voltage Vb of the secondary battery 14 obtained in the analog-to-digital converter 19 when the first internal resistance detection current $Is_1$ was supplied to the secondary battery 14 and $CCV_2$ the terminal voltage Vb of the secondary battery 14 obtained in the analog-to-digital converter 19 when the second internal resistance detection current $Is_2$ was supplied to the secondary battery 14, the internal resistance controlling section 212 may calculate the internal resistance Ri by the following equation (2). Further, since it is sufficient for the first and second internal resistance detection currents $Is_1$, $Is_2$ to be current values different from each other, the current value for the purpose of pulse charging may be changed to be used as the first and second internal resistance detection currents $Is_1$, $Is_2$.

$$Ri=|CCV_1-CCV_2|/|Is_1-Is_2| \qquad (2).$$

In this case, it is possible to reduce a likelihood of extending a charging time for the measurement of the internal resistance Ri since the internal resistance Ri can be measured without zeroing the charging current.

FIG. 2B shows an example in which the terminal voltages Vb are obtained as the closed circuit voltage CCV and the open circuit voltage OCV after the value of the voltage component V4 becomes steady, i.e. after the terminal voltage Vb becomes steady following the rise and fall of the current pulse. However, since it takes time to stabilize a voltage, the terminal voltages Vb, for example, upon the lapse of a preset period Δt after the rise and fall of the current may be obtained as the closed circuit voltage CCV and the open circuit voltage OCV before the terminal voltages Vb reach steady values. Similarly, the terminal voltages Vb upon the lapse of a preset period Δt after the values of the currents to be supplied to the secondary battery 14 are changed to $Is_1$, $Is_2$ may be obtained as $CCV_1$, $CCV_2$. In this case, the terminal voltage Vb is detected while the voltage component V4 is being changed. If the period Δt is set at a specific value, the closed circuit voltage CCV and the open circuit voltage OCV ($CCV_1$, $CCV_2$) obtained in this way are obtained as values reflecting the internal resistance Ri. Therefore, the charging current can be set based on the internal resistance Ri obtained in this way.

Figure 3:
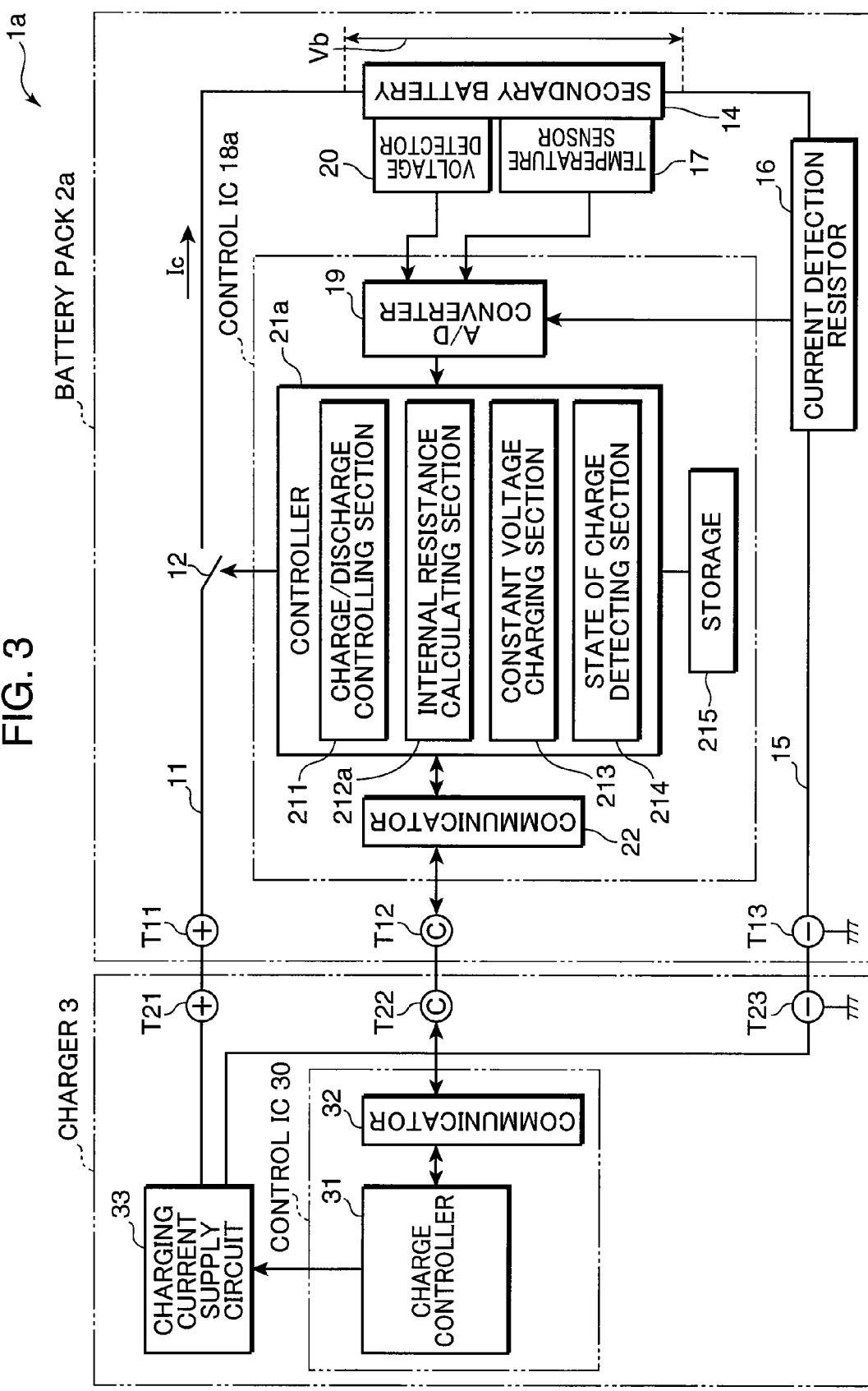
FIG. 3 is a block diagram showing a modification of the charging system shown in FIG. 1.

A storage 215 may be further provided and a controller 21a may be used in place of the controller 21, for example, as shown in FIG. 3. The controller 21a further functions as a state of charge detecting section 214 for detecting the SOC of the secondary battery 14.

The state of charge detecting section 214 calculates the SOC of the secondary battery 14, for example, by integrating the charging current Ic obtained in the analog-to-digital converter 19. The storage 215 is constructed, for example, using a nonvolatile storage element such as an EEPROM (Electrically Erasable and Programmable Read Only Memory), and the SOC of the secondary battery 14 and the internal resistance Ri are stored in correspondence beforehand. An internal resistance controlling section 212a may obtain the internal resistance Ri stored in the storage 215 in correspondence with the SOC of the secondary battery 14 calculated by the state of charge detecting section 214 as the internal resistance Ri of the secondary battery 14.

The constant voltage charging section 213 outputs an instruction to stabilize the output voltage of the charger 3 at a final voltage Vf if the terminal voltage Vb obtained in the analog-to-digital converter 19 rises to or above the final voltage Vf set, for example, to 4.2 V, and performs constant voltage charging by supplying the charging current Ic by means of a charging current supply circuit 33 in such a manner that the final voltage Vf is applied to the secondary battery 14.

In the charger 3, the instruction from the battery pack 2 is received by a communicator 32 as communication means in a control IC 30, a charge controller 31 controls the charging current supply circuit 33 (charging current supplier) to cause the charging current Ic to be supplied with the above voltage value, current value and pulse width. The charging current supply circuit 33 is comprised of an AC-to-DC converter or a DC-to-DC converter, converts the input voltage into the voltage value, current value and pulse width instructed from the charge controller 31 and supplies the charging current Ic to the charging paths 11, 15 via the terminals T21, T11; T23, T13.

The control IC 18 is not limited to the one provided in the battery pack 2, and may be provided in the charger 3.

Figure 4:
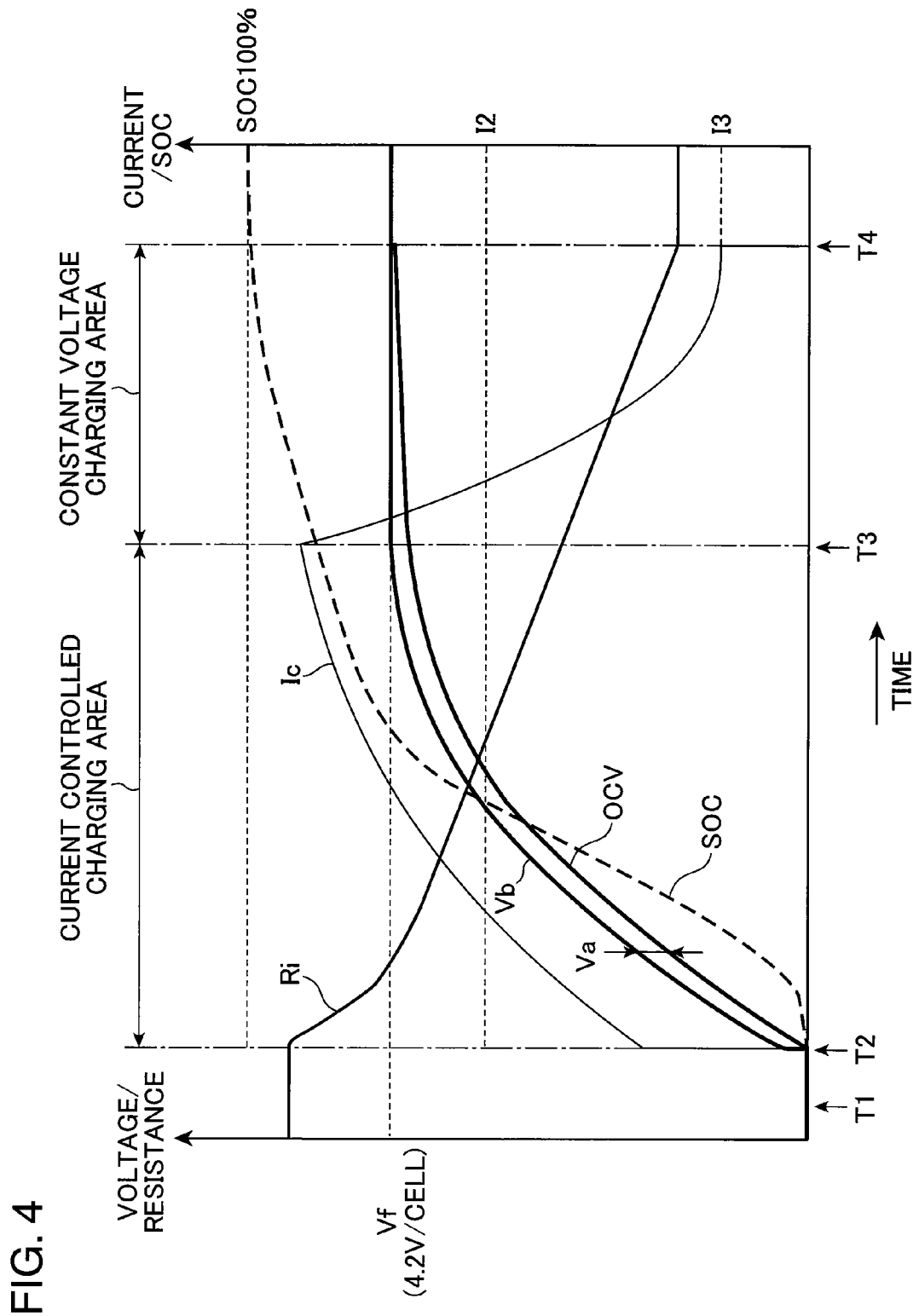
FIG. 4 is a diagram showing an exemplary operation of the charging system shown in FIG. 1.
Figure 5:
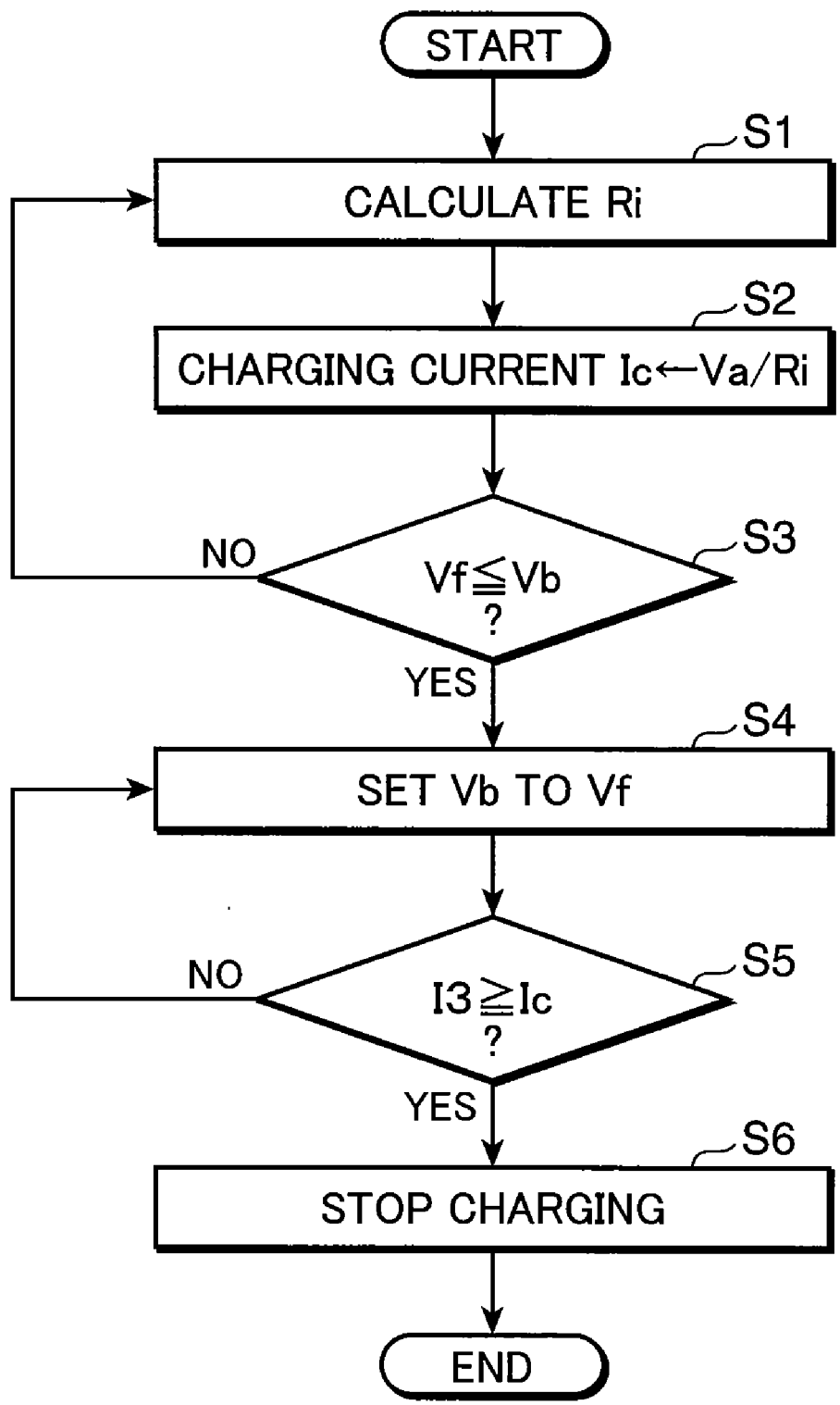
FIG. 5 is a flow chart showing the exemplary operation of the charging system shown in FIG. 1.
Figure 6:
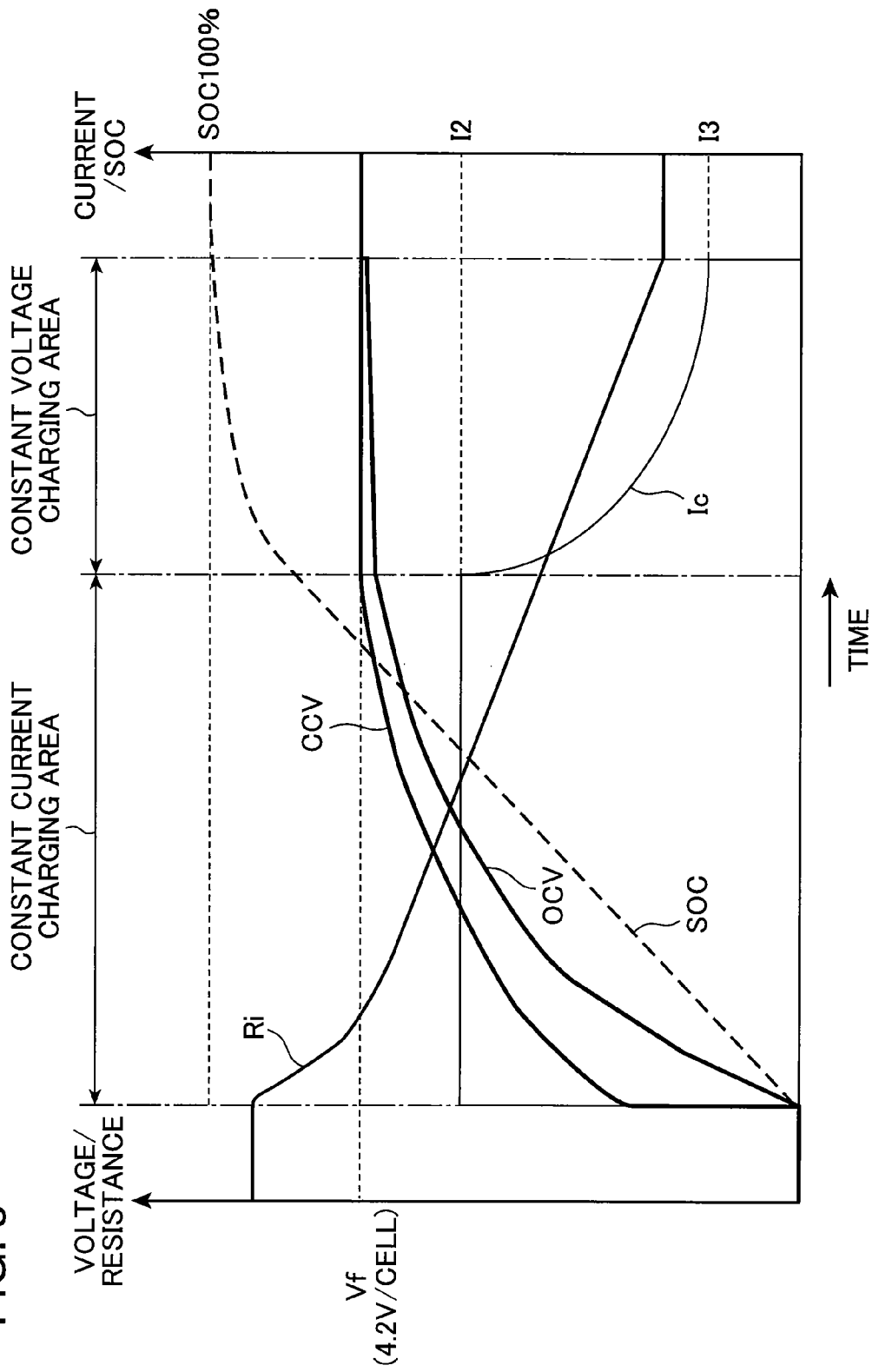
FIG. 6 is a chart showing a secondary battery charging operation by constant-current, constant-voltage (CCCV) charging according to a background art.
Figure 7:
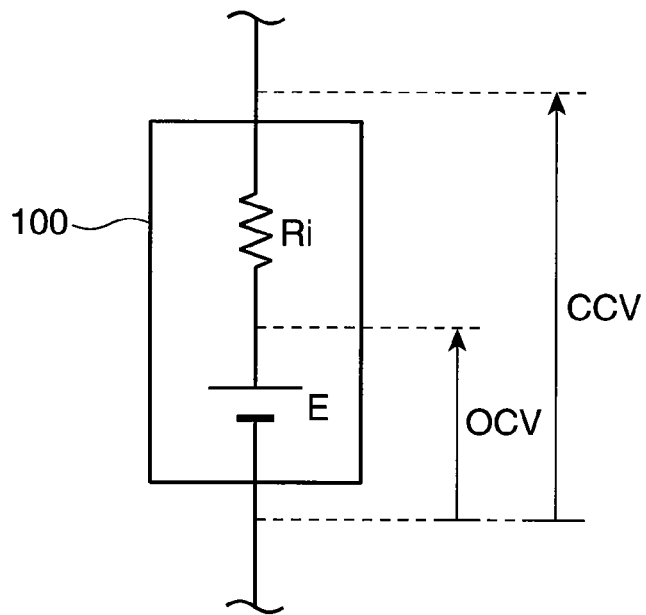
FIG. 7 is a conceptual diagram showing an equivalent circuit of the secondary battery.

Next, the operation of the charging system 1 constructed as above is described. FIG. 4 is a chart showing an exemplary operation of the charging system 1 shown in FIG. 1. FIG. 5 is a flow chart showing the exemplary operation of the charging system shown in FIG. 1. First, the internal resistance Ri of the secondary battery 14 is calculated by the internal resistance controlling section 212 (Step S1, timing T1).

Subsequently, a target value of the charging current Ic is so calculated by the charge/discharge controlling section 211 that a product of the charging current Ic and the internal resistance Ri becomes a specific value Va set beforehand. Specifically, the target value of the charging current Ic is given by the following equation (3):

$$Ic = Va/Ri \qquad (3).$$

Subsequently, an instruction to output the charging current Ic given by the equation (3) is sent to the charge controller 31 by the charge/discharge controlling section 211, and the charging current Ic given by the equation (3) is outputted from the charging current supply circuit 33 in accordance with a control signal from the charge controller 31 (Step S2, timing T2).

Figure 8:
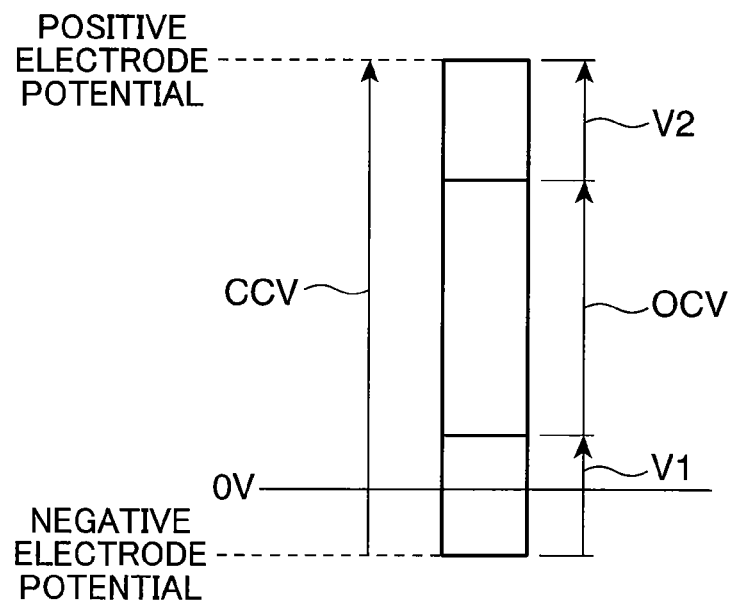
FIG. 8 is a diagram showing an open circuit voltage OCV, a closed circuit voltage CCV and a relationship of potentials at positive and negative electrodes with respect to a lithium reference.

In this case, the set value Va corresponds to a difference between the closed circuit voltage CCV and the open circuit voltage OCV shown in FIG. 8, i.e. Va=V1+V2. The set value Va is so set that the negative electrode potential does not fall to or below 0V due to a voltage drop caused at the negative electrode side of the secondary battery 14, i.e. an excessive increase of the voltage V1.

Then, the charging current Ic flowing into the secondary battery 14 is set to the current value given by the equation (3), thereby reducing a likelihood of decreasing the negative electrode potential to or below 0V. As a result, there can be reduced a likelihood of deteriorating the secondary battery 14 due to the precipitation of lithium at the negative electrode.

Thereafter, the secondary battery 14 is charged with the charging current Ic and the SOC and the terminal voltage Vb gradually increase.

Subsequently, in Step S3, the charge/discharge controlling section 211 compares the final voltage Vf and the terminal voltage Vb, and Steps S1 to S3 are repeated again unless the terminal voltage Vb has reached the final voltage Vf (NO in Step S3) while Step S4 follows to move into constant voltage charging if the terminal voltage Vb is equal to or above the final voltage Vf.

Since the current value of the charging current Ic is so adjusted that the product of the charging current Ic and the internal resistance Ri becomes the specific value Va set beforehand by the operations in Steps S1 to S3, the likelihood that the negative electrode voltage falls to or below 0V by charging is reduced, which results in a reduction in the likelihood of deteriorating the secondary battery 14 due to the precipitation of lithium at the negative electrode. Further, by the operations of Steps S1 to S3, the charging current Ic increases as the internal resistance Ri decreases while decreasing as the internal resistance Ri increases. Then, the charging current Ic is set at a small current value if the internal resistance Ri is large at an initial stage of charging. Thus, self heat generation caused by the flow of the current through the internal resistance Ri is reduced, thereby decreasing a likelihood of deteriorating the secondary battery 14 due to an excessive temperature increase by the self heat generation. Further, since the charging current Ic can be increased as the charging proceeds to decrease the internal resistance Ri, it becomes easier to suppress the extension of the charging time and shorten the charging time by increasing the charging current Ic while reducing the likelihood of deteriorating the secondary battery 14.

Subsequently, in Step S4, an instruction to output the final voltage Vf is given to the charge controller 31 by the constant voltage charging section 213, and the final voltage Vf is outputted from the charging current supply circuit 33 in accordance with a control signal from the charge controller 31 to start the constant voltage charging (timing T3). Then, the final voltage Vf is applied to the opposite ends of the secondary battery 14, and the state of charge SOC of the secondary battery 14 gradually increases while the charging current Ic gradually decreases.

Then, the current value of the charging current Ic obtained in the analog-to-digital converter 19 and the current value I3 are compared by the constant voltage charging section 213, and it is returned to Step S4 to continue the constant voltage charging if the charging current Ic is above the current value I3 (NO in Step S5), whereas an instruction to zero the charging current is outputted to the charge controller 31 by the constant voltage charging section 213 and the output current of the charging current supply circuit 33 is zeroed by the charge controller 31 to finish the charging (Step S6, timing T4) if the charging current Ic is equal to or below the current value I3 (YES in Step S5).

It should be noted that the charge/discharge controlling section 211 may calculate the target value of the charging current Ic so that a product of the square of the charging current Ic and the internal resistance Ri becomes a specific value Wa set beforehand in Step S2. In this case, the charging current Ic is given by a square root of (Wa/Ri). The product of the square of the charging current Ic and the internal resistance Ri is power consumption in the internal resistance Ri. The set value Wa is set to such a value as not to deteriorate the internal resistance Ri by the self heat generation.

If the charging current Ic is so adjusted that the product of the square of the charging current Ic and the internal resistance Ri, i.e. the self heat generation of the internal resistance Ri becomes the specified set value Wa in Steps S1 to S3, the likelihood of deteriorating the secondary battery 14 by an excessive temperature increase caused by the self heat generation of the internal resistance Ri is reduced. Further, since the charging current Ic can be increased as the charging proceeds to decrease the internal resistance Ri, it becomes easier to suppress the extension of the charging time and shorten the charging time by increasing the charging current Ic while reducing the likelihood of deteriorating the secondary battery 14.

A charging system according to one aspect of the present invention comprises a secondary battery; a charging current supplier for supplying a charging current to the secondary battery; an internal resistance detector for detecting the resistance value of the internal resistance of the secondary battery; and a charge controller for increasing the charging current to be supplied to the secondary battery by the charging current supplier as the resistance value detected by the internal resistance detector decreases.

According to this construction, the charging current is increased as the internal resistance of the secondary battery decreases, and the charging current is decreased as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current.

The charge controller preferably causes the charging current supplier to supply the current to the secondary battery such that a product of the current value of the charging current to be supplied to the secondary battery by the charging current supplier and the resistance value detected by the internal resistance detector becomes a specific value set beforehand.

According to this construction, the current to be supplied to the secondary battery is so adjusted that the product of the current to be supplied to the secondary battery and the internal resistance of the secondary battery, i.e. a voltage drop caused by the internal resistance of the secondary battery becomes the specific set value. Thus, a likelihood of deteriorating the secondary battery by an excessive voltage drop caused by the internal resistance of the secondary battery can be reduced.

The charge controller may cause the charging current supplier to supply the current to the secondary battery such that a product of the square of the current value of the charging current to be supplied to the secondary battery by the charging current supplier and the resistance value detected by the internal resistance detector becomes a specific value set beforehand.

According to this construction, the current to be supplied to the secondary battery is so adjusted that the product of the square of the current to be supplied to the secondary battery and the internal resistance of the secondary battery, i.e. the power consumption by the internal resistance of the secondary battery becomes the specific set value. Thus, a likelihood of deteriorating the secondary battery by excessive heat generation caused by the internal resistance of the secondary battery can be reduced.

It is preferable that a voltage detector for detecting a terminal voltage of the secondary battery and a current detector for detecting the current flowing into the secondary battery are further provided; and the internal resistance detector calculates the resistance value of the internal resistance by dividing a difference between the terminal voltage detected by the voltage detector when the charging current supplier supplies a specified first internal resistance detection current to the secondary battery and the terminal voltage detected by the voltage detector when the charging current supplier supplies a specified second internal resistance detection current different from the first internal resistance detection current by a difference between the first internal resistance detection current and the second internal resistance detection current.

According to this construction, the internal resistance is calculated by dividing the difference between the terminal voltage detected by the voltage detector when the first internal resistance detection current is supplied to the secondary battery and the terminal voltage detected by the voltage detector when the second internal resistance detection current is supplied to the secondary battery by the difference between the first internal resistance detection current and the second internal resistance detection current. Thus, the internal resistance of the secondary battery actually used can be obtained, and the actual value of the internal resistance can be obtained even if the internal resistance changes, for example, due to the deterioration of the secondary battery.

Further, it is preferable that a state of charge detector for detecting a state of charge SOC of the secondary battery and a storage for storing the state of charge SOC of the secondary battery and the resistance value of the internal resistance in correspondence with each other are further provided; and that the internal resistance detector obtains the resistance value stored in the storage in correspondence with the state of charge SOC of the secondary battery detected by the state of charge detector as the resistance value of the internal resistance of the secondary battery.

According to this construction, the internal resistance detector can obtain the resistance value stored in the storage in correspondence with the state of charge SOC of the secondary battery detected by the state of charge detector as the internal resistance of the secondary battery by storing the state of charge SOC of the secondary battery and the internal resistance in correspondence beforehand. Thus, in order to obtain the internal resistance of the secondary battery, it is not necessary to obtain an open circuit voltage by zeroing the current supply to the secondary battery and obtaining the terminal voltage by means of the voltage detector. Therefore, the internal resistance can be detected by a simple processing.

It is also preferable to further comprise a voltage detector for detecting the terminal voltage of the secondary battery; and a constant voltage charging section for causing the charging current supplier to supply a current for the charging so that, when the terminal voltage detected by the voltage detector increases to or above a preset final voltage, the secondary battery is charged with a constant voltage through the application of the final voltage.

According to this construction, the terminal voltage of the secondary battery increases by the supply of the current for the charging by the charging current supplier and, when the preset final voltage is reached, it is applied to the secondary battery to charge the secondary battery with the constant voltage. Then, as the charging of the secondary battery proceeds, the charging current of the secondary battery decreases. Therefore, a likelihood of overcharging the secondary battery can be reduced.

A charging device according to another aspect of the present invention comprises a connection terminal for the connection with a secondary battery; a charging current supplier for supplying a current for charging the secondary battery to the connection terminal; an internal resistance detector for detecting the resistance value of the internal resistance of the secondary battery connected with the connection terminal; and a charge controller for increasing the current to be supplied to the connection terminal by the charging current supplier as the resistance value detected by the internal resistance detector decreases.

According to this construction, the charging current is increased as the internal resistance of the secondary battery connected with the connection terminal decreases while being decreased as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current.

A battery pack according to still another aspect of the present invention is a battery pack connected with a charging device for outputting a current for charging a secondary battery in response to an external instruction and comprising a secondary battery; an internal resistance detector for detecting the resistance value of the internal resistance of the secondary battery; and a charge controller for charging the secondary battery by outputting an instruction to the charging device so that a current to be supplied to the secondary battery by the charging device is increased as the resistance value detected by the internal resistance detector decreases.

According to this construction, in response to the instruction from the charge controller, the charging device increases the charging current as the internal resistance of the secondary battery decreases while decreasing the charging current as the internal resistance increases. Then, if the internal resistance of the secondary battery is large as at an initial stage of the charging, the charging current is decreased to reduce a voltage drop and self heat generation caused by the internal resistance of the secondary battery, with the result that a likeliness of deteriorating the secondary battery due to the internal resistance of the secondary battery can be reduced. Further, since the charging current can be increased as the charging proceeds to decrease the internal resistance, it becomes easier to suppress the extension of the charging time and shorten the charging time by increasing the charging current. In this case, it is sufficient for the charging device to output the current in response to the instruction from the battery pack, the same charging device can be used even in the case of charging a battery pack including a secondary battery having different characteristics.

The charging system, charging device and battery pack according to the aspects of the present invention can be suitably applicable as charging systems and battery packs used in battery-driven apparatuses including electronic equipments such as portable personal computers and digital cameras and vehicles such as electric cars and hybrid cars, and as charging devices for charging secondary batteries.

This application is based on Japanese Patent application serial No. 2006-322141 filed in Japan Patent Office on Nov. 29, 2006, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A charging system, comprising:
   a secondary battery;
   a charging current supplier for supplying a charging current to the secondary battery;
   an internal resistance detector for detecting a resistance value of the internal resistance of the secondary battery;
   a charge controller for increasing the charging current to be supplied to the secondary battery by the charging current supplier as the resistance value detected by the internal resistance detector decreases;
   a voltage detector for detecting a terminal voltage of the secondary battery; and
   a current detector for detecting the current flowing into the secondary battery,
   wherein the internal resistance detector calculates the resistance value of the internal resistance by dividing a difference between the terminal voltage detected by the voltage detector when the charging current supplier supplies a specified first internal resistance detection current to the secondary battery and the terminal voltage detected by the voltage detector when the charging current supplier supplies a specified second internal resistance detection current different from the first internal resistance detection current by a difference between the first internal resistance detection current and the second internal resistance detection current.

2. A charging system according to claim 1, wherein the charge controller causes the charging current supplier to supply the current to the secondary battery such that a product of the square of the current value of the charging current to be supplied to the secondary battery by the charging current supplier and the resistance value detected by the internal resistance detector becomes a specific value set beforehand.

3. A charging system according to claim 1, wherein the charge controller causes the charging current supplier to supply the current to the secondary battery such that a product of the current value of the charging current to be supplied to the secondary battery by the charging current supplier and the resistance value detected by the internal resistance detector becomes a specific value set beforehand.

4. A charging system according to claim 1, further comprising:
   a voltage detector for detecting a terminal voltage of the secondary battery; and
   a constant voltage charging section for causing the charging current supplier to supply a current for the charging so that, when the terminal voltage detected by the voltage detector increases to or above a preset final voltage, the secondary battery is charged with a constant voltage through the application of the final voltage.

5. A charging system according to claim 3, further comprising:
   a constant voltage charging section for causing the charging current supplier to supply a current for the charging so that, when the terminal voltage detected by the voltage detector increases to or above a preset final voltage, the secondary battery is charged with a constant voltage through the application of the final voltage.

6. A charging system according to claim 2, further comprising:
   a constant voltage charging section for causing the charging current supplier to supply a current for the charging so that, when the terminal voltage detected by the voltage detector increases to or above a preset final voltage, the secondary battery is charged with a constant voltage through the application of the final voltage.

7. A charging system, comprising:
a secondary battery;
a charging current supplier for supplying a charging current to the secondary battery;
an internal resistance detector for detecting a resistance value of the internal resistance of the secondary battery; and
a charge controller for increasing the charging current to be supplied to the secondary battery by the charging current supplier as the resistance value detected by the internal resistance detector decreases;
a state of charge detector for detecting a state of charge SOC of the secondary battery;
a storage for storing the state of charge SOC of the secondary battery and the resistance value of the internal resistance in correspondence with each other;
a voltage detector for detecting a terminal voltage of the secondary battery; and
a constant voltage charging section for causing the charging current supplier to supply a current for the charging so that, when the terminal voltage detected by the voltage detector increases to or above a preset final voltage, the secondary battery is charged with a constant voltage through the application of the final voltage, wherein the internal resistance detector obtains the resistance value stored in the storage in correspondence with the state of charge SOC of the secondary battery detected by the state of charge detector as the resistance value of the internal resistance of the secondary battery; and
the charge controller causes the charging current supplier to supply the current to the secondary battery such that a product of the current value of the charging current to be supplied to the secondary battery by the charging current supplier and the resistance value detected by the internal resistance detector becomes a specific value set beforehand.

8. A charging system, comprising:
a secondary battery;
a charging current supplier for supplying a charging current to the secondary battery;
an internal resistance detector for detecting a resistance value of the internal resistance of the secondary battery; and
a charge controller for increasing the charging current to be supplied to the secondary battery by the charging current supplier as the resistance value detected by the internal resistance detector decreases;
a state of charge detector for detecting a state of charge SOC of the secondary battery;
a storage for storing the state of charge SOC of the secondary battery and the resistance value of the internal resistance in correspondence with each other;
a voltage detector for detecting a terminal voltage of the secondary battery; and
a constant voltage charging section for causing the charging current supplier to supply a current for the charging so that, when the terminal voltage detected by the voltage detector increases to or above a preset final voltage, the secondary battery is charged with a constant voltage through the application of the final voltage,
wherein the internal resistance detector obtains the resistance value stored in the storage in correspondence with the state of charge SOC of the secondary battery detected by the state of charge detector as the resistance value of the internal resistance of the secondary battery; and
the charge controller causes the charging current supplier to supply the current to the secondary battery such that a product of the square of the current value of the charging current to be supplied to the secondary battery by the charging current supplier and the resistance value detected by the internal resistance detector becomes a specific value set beforehand.

9. A charging device, comprising:
a connection terminal for the connection with a secondary battery,
a charging current supplier for supplying a current for charging the secondary battery to the connection terminal;
an internal resistance detector for detecting a resistance value of the internal resistance of the secondary battery connected with the connection terminal;
a charge controller for increasing the current to be supplied to the connection terminal by the charging current supplier as the resistance value detected by the internal resistance detector decreases;
a voltage detector for detecting a terminal voltage of the secondary battery; and
a current detector for detecting the current flowing into the secondary battery,
wherein the internal resistance detector calculates the resistance value of the internal resistance by dividing a difference between the terminal voltage detected by the voltage detector when the charging current supplier supplies a specified first internal resistance detection current to the secondary battery and the terminal voltage detected by the voltage detector when the charging current supplier supplies a specified second internal resistance detection current different from the first internal resistance detection current by a difference between the first internal resistance detection current and the second internal resistance detection current.

10. A battery pack to be connected with a charging device for outputting a current for charging a secondary battery in response to an external instruction, comprising:
a secondary battery;
an internal resistance detector for detecting a resistance value of the internal resistance of the secondary battery; and
a charge controller for charging the secondary battery by outputting the instruction to the charging device so that a current to be supplied to the secondary battery by the charging device is increased as the resistance value detected by the internal resistance detector decreases;
a voltage detector for detecting a terminal voltage of the secondary battery; and
a current detector for detecting the current flowing into the secondary battery,
wherein the internal resistance detector calculates the resistance value of the internal resistance by dividing a difference between the terminal voltage detected by the voltage detector when the charging current supplier supplies a specified first internal resistance detection current to the secondary battery and the terminal voltage detected by the voltage detector when the charging current supplier supplies a specified second internal resistance detection current different from the first internal resistance detection current by a difference between the first internal resistance detection current and the second internal resistance detection current.

* * * * *